Aug. 16, 1966 J. R. IRELAND 3,267,310
MAGNETIC TRANSMISSION
Filed May 7, 1963
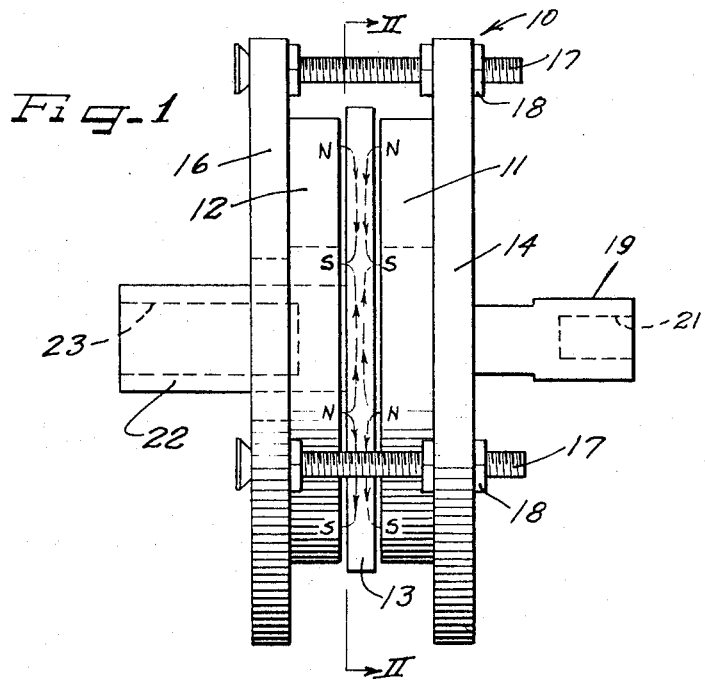
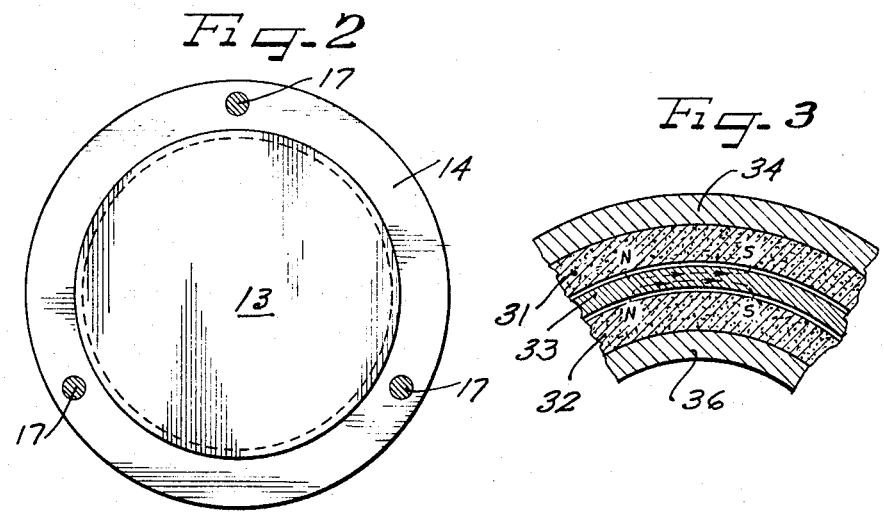
INVENTOR.
James R. Ireland
BY
Hill, Sherman, Meroni, Gross & Simpson
ATTORNEYS

United States Patent Office 3,267,310
Patented August 16, 1966

---

3,267,310
MAGNETIC TRANSMISSION
James R. Ireland, Valparaiso, Ind., assignor to Indiana General Corporation, Valparaiso, Ind., a corporation of Indiana
Filed May 7, 1963, Ser. No. 278,703
7 Claims. (Cl. 310—103)

The present invention relates to an improved magnetic transmission employing a novel type of hysteresis coupling unit.

In magnetic transmission assemblies of the past, it was common practice to employ confronting magnetic elements with opposite magnetic poles confronting each other, and interpose a hysteresis material such as an "Alnico" magnet, cobalt steel, or other materials of this nature between the magnetic elements. As the interconnected magnetic elements rotated, the hysteresis element was also driven as long as the load on the hysteresis element did not exceed the torque load of the coupling. In order for such arrangements to be practical, however, the permanent magnetic materials used had to be of the high flux density type, since much of the flux was in the direction of the thin dimension of the hysteresis member. In many applications, a ring of high permeability material such as soft iron was required in contact with the hysteresis unit on the side opposite the magnet to concentrate the flux in this direction.

With the advent of the relatively low flux density magnets, particularly the ceramic magnets normally containing, for example, one molecular proportion of barium oxide, strontium oxide, or lead oxide in combination with six molecular proportions of ferric oxide, it was possible to secure the same total magnetic energy of prior art magnets in a much lower cost material. However, these low flux density materials are not suitable in hysteresis coupling members as previously designed because the magnetic flux density was insufficient to provide the required high flux density in the hysteresis member.

The present invention provides a new arrangement for accommodating the ceramic type, relatively low flux density magnets in hysteresis coupling units. Essentially, the hysteresis coupling unit of the present invention includes at least a pair of ceramic magnet assemblies of relatively low flux densities disposed in spaced confronting relation with like magnetic poles confronting each other. A hysteresis member is interposed in the space between the ceramic magnets with sufficient clearance being provided to accommodate the rotation of the hysteresis member. The latter is, in accordance with the present invention, circumferentially oriented, that is, it is preferentially magnetized in a circumferential direction. Due to the bucking flux paths created by the spaced ceramic magnets, the hysteresis member thereby receives a high flux density which, in turn, provides a high torque.

Accordingly, an object of the present invention is to provide a magnetic transmission with an improved hysteresis coupling unit.

A further object of the invention is to provide a hysteresis coupling unit which employs ceramic type magnets of relatively low magnetic flux density.

Still another object of the invention is to provide an improved hysteresis coupling unit which operates at high flux density despite the use of magnets of relatively low magnetic flux density.

A further description of the present invention will be made in conjunction with the attached sheet of drawings which illustrates several preferred embodiments thereof.

In the drawings:

FIGURE 1 is an end elevational view of a hysteresis coupling unit embodying the principles of the present invention;

FIGURE 2 is a cross-sectional view taken substantially along the line II—II of FIGURE 1; and FIGURE 3 is a fragmentary cross-sectional view of a modified form of the invention involving a radial rather than an axial gap.

As shown in the drawings:

In FIGURE 1, reference numeral 10 indicates generally a hysteresis coupling unit embodying the principles of the present invention and including a pair of opposed, confronting disc magnets 11 and 12 composed of a relatively low flux density material such as the barium ferrite materials being marketed commercially under the trademark "Indox." As shown in FIGURE 1, the two magnetic discs 11 and 12 are aligned in axially spaced relation with like poles on the two magnetic discs facing each other while providing a gap therebetween. In this gap there is a hysteresis member 13 composed of a circumferentially oriented magnet material preferably of the "Alnico" type. The particular materials which we prefer to use for the hysteresis member are the magnets of the "Alnico V" series which contain approximately 8% aluminum, from 13 to 15% nickel, from 23 to 24% cobalt, about 3% copper, with iron being substantially the balance. In some compositions, small amounts of titanium on the order of 0.5% are also included. These materials are capable of being cast and heat treated to produce precipitation or diffusion hardened alloys. As indicated in FIGURE 1, the hysteresis member 13 is disposed in slightly spaced relation from both the ceramic disc magnets 11 and 12 so as to provide a running clearance between the two, the amount of the clearance determining the effective torque which is produced by the assembly.

The ceramic disc magnets 11 and 12 are supported on ferromagnetic supports which may take the form of mild steel back plates 14 and 16 respectively. The back plates also provide a return path for the magnetic circuit. The plates 14 and 16 are rigidly connected together by means of non-magnetic bolts 17 which are received in threaded engagement within nuts 18 on the end plates.

The input drive torque is applied to the end plates 14 and 16, and hence to the ceramic disc magnets 11 and 12 carried thereby by means of a shaft 19 secured to the end plate 14 and having an axial bore 21 for engaging the input drive shaft. The output from the coupling member is derived through an output shaft 22 secured to the hysteresis member 13 and provided with an axial bore 23 for receiving the output shaft.

As indicated in FIGURE 1, the lines of flux passing through the hysteresis member 13 from both sides of the discs create bucking fields. Since the hysteresis member 13 is circumferentially oriented, the flux paths exist in a circumferential direction with respect to the hysteresis member and thereby create a substantially higher magnetic flux density than would occur if the magnetic poles of the ceramic disc magnets 14 and 16 were aligned with opposite poles in confronting relation. The result is the production of a substantial torque on the output shaft 22 when the input shaft 21 is driven.

A modified form of the invention is illustrated in FIGURE 3 of the drawings in which the axial gap arrangement of FIGURES 1 and 2 is replaced by a radial gap arrangement. In this embodiment, a pair of hollow cylindrical concentric ceramic magnets 31 and 32 are disposed with like poles in confronting relation across the radial gap thus provided. A hysteresis member 33 is interposed in this gap and is also concentric with respect to the axis of the ceramic magnets 31 and 32. A pair of mild steel backing cylinders 34 and 36 are coupled together mechanically and provide the return flux paths for the ceramic magnets 31 and 32. As shown in FIGURE 3, the flux lines passing through the hysteresis member 33 are in bucking relation, causing the flux to become concentrated and thereby increasing the flux densities through the circumferentially oriented hysteresis member 33.

While the invention has been described in connection with several preferred embodiments, it should be evident that various modifications can be made in terms of structure and in the selection of materials without departing from the scope of the present invention.

I claim as my invention:

1. A hysteresis coupling unit comprising a pair of ceramic magnet assemblies of relatively low flux density in spaced confronting relation with like magnetic poles confronting each other, a hysteresis member interposed in the space between said ceramic magnet assemblies, means for coupling a drive means to said pair of ceramic magnet assemblies, and torque transmitting means coupled to said hysteresis member.

2. A hysteresis coupling unit comprising a pair of ceramic ring magnets of relatively low flux density, means securing said ring magnets together in spaced coaxial relation with similar magnetic poles confronting each other, a hysteresis member disposed between and in spaced relation to said ring magnets, means for coupling a drive means to said pair of ring magnets, and torque transmitting means secured to said hysteresis member.

3. A hysteresis coupling unit comprising a pair of circumferentially oriented ceramic ring magnets of relatively low flux density, means securing said ring magnets together in spaced coaxial relation, with similar magnetic poles confronting each other, a hysteresis member disposed between and in spaced relation to said ring magnets, means for coupling a drive means to said pair of ring magnets, and torque transmitting means secured to said hysteresis member.

4. The coupling unit of claim 2 in which said ceramic ring magnets are composed of a barium ferrite material containing approximately 6 molecular proportions of ferric oxide to 1 molecular proportion of barium oxide.

5. A hysteresis coupling unit comprising a pair of ceramic magnet assemblies of relatively low flux density in spaced confronting relation with like poles confronting each other, a pair of ferromagnetic supports on opposite sides of said ceramic magnet assemblies, means rigidly securing said supports together, a hysteresis member disposed between and in spaced relation to said ceramic magnet assemblies, means for establishing a driving connection to said supports and the ceramic magnet assemblies carried thereby, and means for coupling said hysteresis member to an external load.

6. A hysteresis coupling unit comprising a pair of ceramic magnet disc assemblies in confronting relation with like poles confronting each other, a ferromagnetic end plate on opposite sides of said disc assemblies, means rigidly securing said end plates together, a circumferentially oriented hysteresis disc disposed between and in spaced relation to said pair of ceramic disc assemblies, means for coupling said end plates and the magnets carried thereby to a driving means, and means for coupling said hysteresis disc to an external load.

7. The coupling unit of claim 5 in which said ceramic magnet assemblies and said hysteresis member are hollow cylinders in coaxial alignment.

No references cited.

MILTON O. HIRSHFIELD, *Primary Examiner.*

D. X. SLINEY, *Assistant Examiner.*